(12) United States Patent
Beck (10) Patent No.: US 8,567,495 B2
(45) Date of Patent: Oct. 29, 2013

(54) SYSTEM AND METHOD FOR DETECTING PRESSURE IN A SUBTERRANEAN ENVIRONMENT

(75) Inventor: David W. Beck, Santa Fe, NM (US)

(73) Assignee: Chevron U.S.A. Inc., San Ramon, CA (US)

( * ) Notice: Subject to any disclaimer, the term of this patent is extended or adjusted under 35 U.S.C. 154(b) by 444 days.

(21) Appl. No.: 12/908,810

(22) Filed: Oct. 20, 2010

(65) Prior Publication Data

US 2012/0097388 A1   Apr. 26, 2012

(51) Int. Cl.
  *E21B 47/06*  (2012.01)
  *G01L 9/10*  (2006.01)
(52) U.S. Cl.
  USPC ............ 166/250.07; 166/66; 73/152.51; 73/733
(58) Field of Classification Search
  USPC ............ 166/250.07, 66; 73/152.51, 733, 734, 73/736, 741–743; 361/283.1, 382.2; 324/660
  See application file for complete search history.

(56) References Cited

U.S. PATENT DOCUMENTS

| | | | | |
|---|---|---|---|---|
| 2,745,993 A | * | 5/1956 | Foster | 361/292 |
| 3,296,522 A | * | 1/1967 | Wolfendale | 340/870.37 |
| 3,668,672 A | * | 6/1972 | Parnell | 324/660 |
| 4,234,139 A | * | 11/1980 | Porchia | 361/289 |
| 4,357,834 A | * | 11/1982 | Kimura | 73/708 |
| 4,719,538 A | * | 1/1988 | Cox | 361/283.2 |
| 4,873,870 A | * | 10/1989 | Delatorre | 73/733 |
| 5,168,419 A | * | 12/1992 | Delatorre | 361/283.2 |
| 5,172,039 A | * | 12/1992 | Owens | 318/489 |
| 5,207,767 A | * | 5/1993 | Delatorre | 73/733 |
| 5,230,250 A | * | 7/1993 | Delatorre | 73/733 |
| 5,317,918 A | * | 6/1994 | Lew | 73/718 |
| 5,363,703 A | | 11/1994 | Delatorre | |
| 5,388,462 A | * | 2/1995 | Delatorre | 73/718 |
| 5,431,065 A | * | 7/1995 | Delatorre | 73/862.626 |
| 5,537,109 A | * | 7/1996 | Dowd | 340/870.37 |
| 6,147,855 A | * | 11/2000 | Taylor, Jr. | 361/277 |
| 6,774,642 B2 | * | 8/2004 | Lin et al. | 324/660 |
| 2008/0061789 A1 | | 3/2008 | Coates et al. | |

OTHER PUBLICATIONS

International Search Report and Written Opinion for PCT International Patent Application No. PCT/US2011/056703, mailed Jan. 20, 2012.

* cited by examiner

*Primary Examiner* — Giovanna Wright
*Assistant Examiner* — Blake Michener
(74) *Attorney, Agent, or Firm* — Parul Anderson; D. Benjamin Esplin; Robert C. F. Perez (57) ABSTRACT

A sensor is configured to sense pressure in an isolated or subterranean environment. The sensor is configured to act as a capacitor with a capacitance that varies as a function of pressure. The sensor has a robust design with minimal moving parts, and in which any parts that do move do not communicate electrically through direct electrical conduction (e.g., through conductive leads). Instead, moving parts that participate in the performance of sensor as a capacitor receive and dispense electrical charge only through a dielectric fluid (e.g., a gas or liquid within the sensor). This may reduce hysterysis, lag, and/or friction with respect to pressure-dependent capacitor designs in which wiring is connected directly to moving parts.

19 Claims, 5 Drawing Sheets

SYSTEM AND METHOD FOR DETECTING PRESSURE IN A SUBTERRANEAN ENVIRONMENT

FIELD OF THE INVENTION

The invention relates to detecting pressure in a subterranean environment, and in particular, in a wellbore.

BACKGROUND OF THE INVENTION

In resource recovery, it may be useful to monitor various conditions at locations remote from an observer. In particular, it may be useful to provide for monitoring conditions at or near to the bottom of a borehole that has been drilled either for exploratory or production purposes. Because such boreholes may extend several miles, it is not always practical to provide wired communications systems for such monitoring.

U.S. Pat. No. 6,766,141 (Briles et al) discloses a system for remote down-hole well telemetry. The telemetry communication is used for oil well monitoring and recording instruments located in a vicinity of a bottom of a gas or oil recovery pipe. Modulated reflectance is described for monitoring down-hole conditions.

As described in U.S. Pat. No. 6,766,141, a radio frequency (RF) generator/receiver base station communicates electrically with the pipe. The RF frequency is described as an electromagnetic radiation between 3 Hz and 30 GHz. A down-hole electronics module having a reflecting antenna receives a radiated carrier signal from the RF generator/receiver. An antenna on the electronics module can have a parabolic or other focusing shape. The radiated carrier signal is then reflected in a modulated manner, the modulation being responsive to measurements performed by the electronics module. The reflected, modulated signal is transmitted by the pipe to the surface of the well where it can be detected by the RF generator/receiver.

SUMMARY

One aspect of the invention relates to a system configured to sense a pressure in a subterranean environment. In one embodiment, the system comprises a signal generator, a sensor probe, a receiver, and one or more processors. The signal generator is configured to generate an electromagnetic signal. The sensor probe is configured to be located within a region of the subterranean environment. The sensor probe includes a resonant circuit portion that includes a capacitive element. The resonant circuit portion is configured to receive energy from the electromagnetic signal and to generate a resonating signal in response to the electromagnetic signal. The capacitive element of the sensor probe is responsive to a pressure condition in the region of the subterranean environment to modulate the resonant signal in accordance therewith. The capacitive element comprises a deformable element, a stator, a rotor, and a first capacitor. The deformable element is configured to undergo physical deformation responsive to changes in pressure within the region of the subterranean environment. The rotor is mechanically coupled to the deformable element and is configured to rotate with respect to the stator responsive to deformation of the deformable element. The first capacitor has portions carried by the rotor and the stator such that capacitance of the first capacitor varies based on the rotational orientation of the rotor with respect to the stator, the capacitance of the first capacitor thereby being indicative of pressure within the region of the subterranean environment. The receiver is configured to receive the modulated resonant signal. The one or more processors are configured to process the modulated resonant signal to obtain a measurement of the pressure condition.

Another aspect of the invention relates to method of measuring pressure in subterranean environment using a system having (i) a stator and a rotor configured such that the rotational orientation of the rotor with respect to the stator varies as a function of pressure within the subterranean environment, and (ii) a first capacitor having portions carried by each of the rotor and the stator such that capacitance of the first capacitor varies as a function of rotational orientation of the rotor with respect to the stator. In one embodiment, the method comprises generating a signal having a predetermined frequency spectrum; and modulating the frequency spectrum of the generated signal based on the rotational orientation of the rotor with respect to the stator, such modulation being indicative of pressure in the subterranean environment.

Yet another aspect of the invention relates to a pressure sensor. In one embodiment, the pressure sensor comprises a pressure interface portion, a deformable element, a stator, a rotor, and a first capacitor. The pressure interface portion has a pressure interface open to an environment to be sensed. The deformable element is in fluid communication with the pressure interface, and is configured to undergo physical deformation responsive to changes in pressure. The rotor is mechanically coupled to the deformable element and is configured to rotate with respect to the stator responsive to deformation of the deformable element. The first capacitor has portions carried by the rotor and the stator such that capacitance of the first capacitor varies based on the rotational orientation of the rotor with respect to the stator, the capacitance of the first capacitor thereby being indicative of pressure at the pressure interface.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
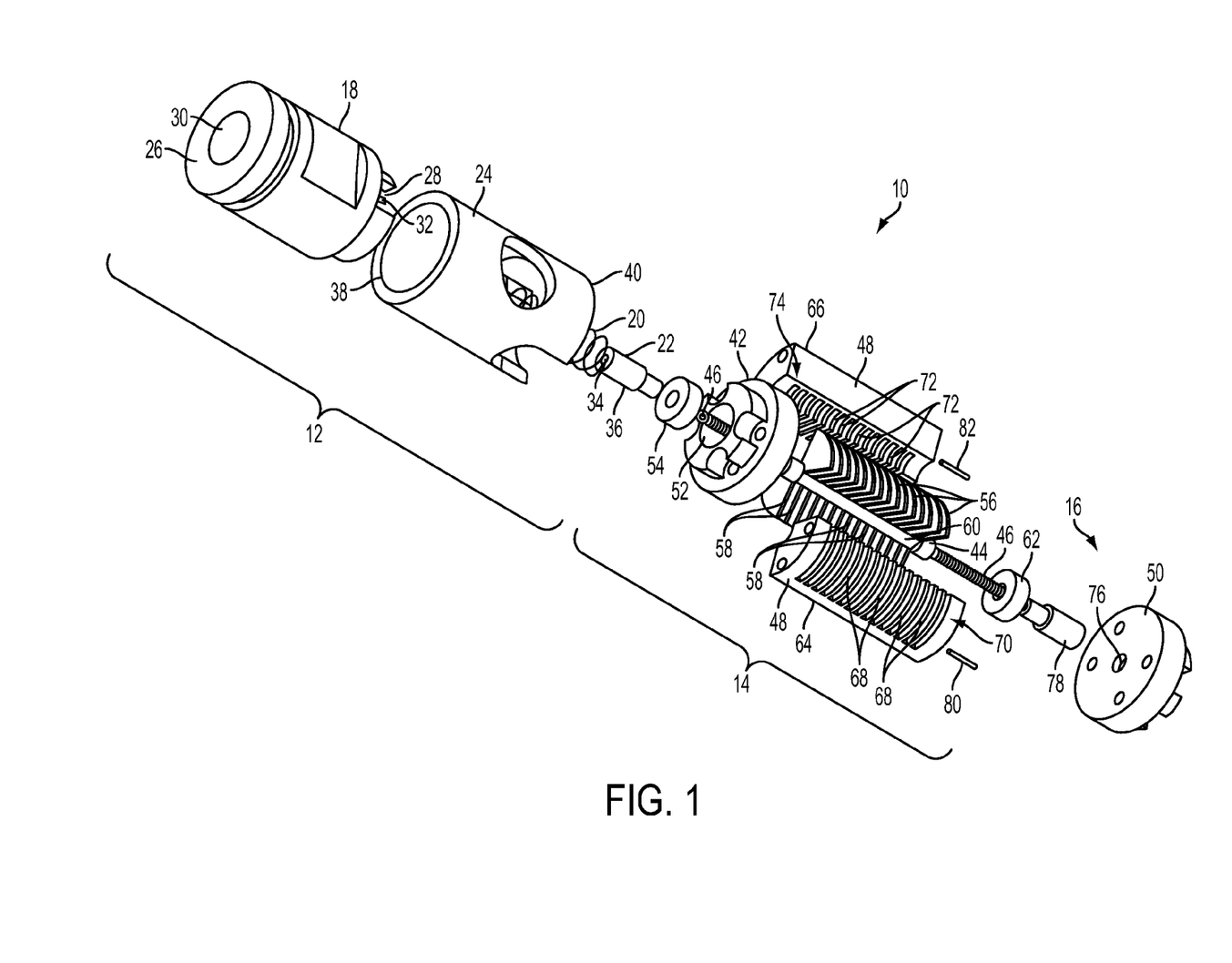
FIG. 1 illustrates an exploded view of a sensor, according to one or more embodiments of the invention.
Figure 2:
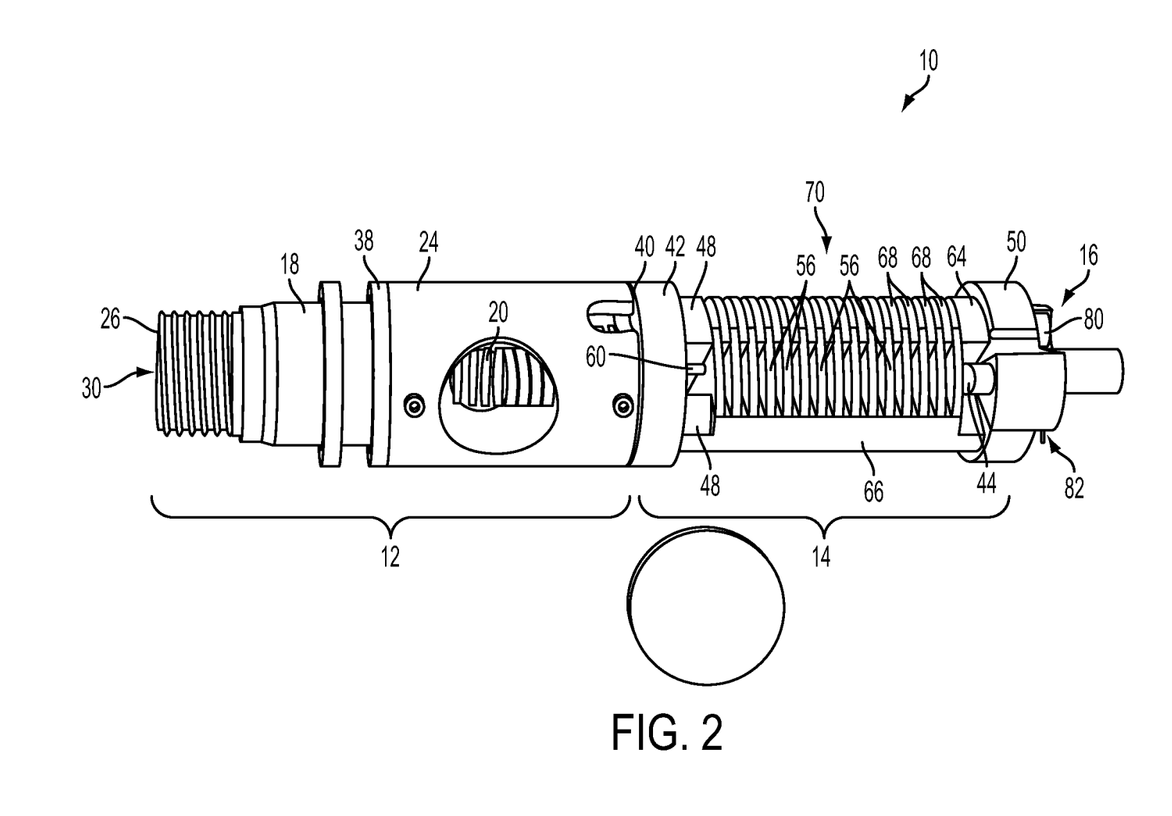
FIG. 2 illustrates a view of an assembled sensor, in accordance with one or more embodiments of the invention.

FIG. 1 illustrates an exploded view of a sensor 10, and FIG. 2 illustrates a view of sensor 10 assembled. The sensor 10 is configured to generate an output signal conveying information related to pressure. In particular, the sensor 10 is configured to act as a capacitor with a capacitance that varies as a function of pressure. The sensor 10 has a robust design with minimal moving parts, and in which any parts that do move do not communicate electrically through direct electrical conduction (e.g., through conductive leads). Instead, moving parts that participate in the performance of sensor 10 as a capacitor receive and dispense electrical charge only through a dielectric fluid (e.g., a gas or liquid within the sensor). This may reduce hysterysis, lag, and/or friction with respect to pressure-dependent capacitor designs in which wiring is connected directly to moving parts. As can be seen in FIG. 1, sensor 10 includes a pressure reception section 12, a capacitance section 14, and a terminal section 16.

The pressure reception section 12 of sensor 10 is configured to receive fluid (e.g., a gas or liquid) for which pressure is to be measured, and to translate changes in pressure into the generation of mechanical force. The pressure reception section 12 comprises a pressure interface 18, a deformable element 20, a rotational interface 22, a spacer sleeve 24, and/or other components.

The pressure interface 18 has a generally elongated shape. The cross section of pressure interface 18 is generally circular such that the pressure interface 18 is generally cylindrical. The pressure interface 18 has a first end 26 and a second end 28. When sensor 10 is assembled, the first end 26 is exposed to ambient fluid (e.g., liquid, gas, etc.). The pressure interface 18 is configured to form an ambient fluid opening 30 at first end 26 and an element interface 32 at second end 28. The pressure interface 18 may form a flow path between ambient fluid opening 30 and element interface 32 such that ambient fluid received into pressure interface 18 at ambient fluid opening 30 communicates with element interface 32 via the flow path. The flow path may be relatively direct (e.g., straight from ambient fluid opening 30 to element interface 32) or relatively serpentine.

The pressure interface 18 may be formed from one or more materials rigid or semi-rigid materials having relatively high thermal stability, and resistance to corrosion and fatigue. As is discussed further below, sensor 10 may be configured to withstand operating conditions present within a subsurface wellbore for fossil fuel extraction. Such operating conditions may include temperatures between about 20 degrees Fahrenheit and about 550 degrees Fahrenheit, and operating pressures of up to about 15,000 pounds per square inch. The materials used to form pressure interface 18 may be capable of withstanding such conditions. Such materials may include one or more of a stainless steel, a high nickel alloy, a ceramic, and/or other materials.

The deformable element 20 is configured to undergo physical deformation responsive to changes in pressure. As such, deformable element 20 may be formed as a hollow body. The hollow body forms an opening that communicates with the interior of the hollow body. When sensor 10 is assembled, the opening formed by the hollow body of deformable element 20 connects with element interface 32 of pressure interface 18 to permit the exchange of fluid between pressure interface 18 and deformable element 20. This connection may be sealed, or substantially sealed, to prevent fluid received into pressure interface 18 from being leaked into the rest of sensor 10. Thus, fluid within the hollow body communicates with ambient fluid via ambient fluid opening 30 and the flow path formed through pressure interface 18. The deformable element 20 is configured to deform responsive to changes in pressure of the fluid held in the hollow body of deformable element 20. By way of non-limiting example, deformable element 20 may include a Bourdon tube.

In one embodiment, the opening formed by deformable element 20 to receive fluid from pressure interface 18 is formed at a first end of deformable element 20. At a second end of deformable element 20 opposite the first end, deformable element 20 includes and/or is connected with a force output 34. The force output 34 is configured to apply a force to one or more other components that is generated by deformation of deformable element 20 responsive to changes in pressure. For example, in one embodiment, deformable element 20 has a curved or helical shape, and force output 34 is configured to output a rotational force to one or more other components (as is described further herein) responsive to deformation of deformable element 20. The curved or helical shape may be a hollow helix, a coil of flattened tubing, and/or other shapes.

In operation, changes in ambient pressure result in changes in pressure within the hollow body formed by deformable element 20. This is because ambient pressure is communicated with the gas inside of deformable element 20 via the opening formed by deformable element 20, element interface 32, and ambient fluid opening 30. The changes in ambient pressure resulting in changes to pressure within deformable element 20 cause deformation of deformable element 20. If deformable element 20 has a curved or helical shape, such deformation may include one or both of the straightening of deformable element 20 (for pressure increasing) and/or the coiling or relaxation of deformable element 20 (for pressure decreasing) The coiling and straightening of deformable element 20 responsive to changes in pressure cause rotational displacement of force output 34. Such rotational displacement of force output 34 may be about an axis of rotation that coincides with a general longitudinal axis of sensor 10.

The deformable element 20 may be formed to operate properly within the conditions present in a subsurface wellbore for fossil fuel extraction. The material(s) used to form deformable element 20 may further be resistant to fatigue caused by the ongoing deformation of deformable element 20 responsive to changes in pressure. By way of non-limiting example, deformable element 20 may be formed from Inconel, beryllium, a high nickel super-alloy, and/or other materials.

The rotational interface 22 may be configured to receive the force output from force output 34, and to rotate one or more other components of sensor 10 within capacitance section 14. In one embodiment, rotational interface 22 is a generally cylindrical member having a staged profile such that the cross section of rotational interface 22 at an end of rotational interface 22 facing toward deformable element 20 is larger than the cross section of rotational interface 22 at an end of rotational interface 22 facing away from deformable element 20. The end of rotational interface 22 facing toward deformable element 20 is configured to mechanically engage with force output 34 of deformable element 20 such that rotation of force output 34 results in corresponding rotation by rotational interface 22. In one embodiment, rotational interface 22 includes a slot 36 configured to receive force output 34 therein.

The spacer sleeve 24 may be configured to house the other components of pressure reception section 12. As such, spacer sleeve 24 may have a generally hollow, cylindrical shape configured to accommodate therein rotational interface 22, deformable element 20, and at least a portion of pressure interface 18 therein. At a first end 38 of spacer sleeve 24, spacer sleeve 24 may form an opening in which pressure interface 18 is seated. At a second end 40 of spacer sleeve 24, spacer sleeve 24 may be configured to connect with capacitance section 14. The spacer sleeve 24 may be configured to maintain the generally longitudinal and/or radial alignment of deformable element 20 therein.

The spacer sleeve 24 may be formed from one or more materials capable of withstanding the operating conditions within a subsurface wellbore for the extraction of fossil fuels. Such materials may include one or more of steel, ceramic, plastic, and/or other materials.

The capacitance section 14 is configured to act as a capacitor for which capacitance varies as a function of pressure. To function in this manner, capacitance section 14 is configured such that capacitance varies as a function of the deformation of deformable element 20. The capacitance section 14 may include one or more of a first end piece 42, a rotor 44, an axle 46, a stator 48, a second end piece 50, and/or other components.

The first end piece 42 is configured to interface with pressure reception section 12 to hold capacitance section 14 in position with respect to pressure reception section 12. For example, first end piece 42 may be configured for mounting to pressure reception section 12 (e.g., at spacer sleeve 24). The first end piece 42 may be affixed to pressure reception section 12 by welding, bonding, adhesive, fastener, friction, magetism, and/or other mechanisms for fixing components together.

The shape of first end piece 42 may correspond generally to the outer cross section of pressure reception section 12. The first end piece 42 is formed having a central opening 52 their through. The central opening 52 is formed to enable force output 34 to communicate with one or more components within capacitance section 14. For example, force output 34 may be seated in central opening 52, and may be mechanically coupled to one or more components within capacitance section 14. The central opening 52 may further provide a seat for a bearing 54. Bearing 54 may hold force output 34 (or some component connected thereto), and may enable force output 34 (or connected component) to rotate freely (e.g., with little friction) with respect to first end piece 42.

The first end piece 42 may be formed from one or more materials capable of withstanding the operating conditions within a subsurface wellbore for the extraction of fossil fuels. Such materials may include one or more of celazole, ceramic, polyether ether ketone, and/or other materials.

The rotor 44 is configured to rotate about axle 46, which runs longitudinally through capacitance section 14. At an end of rotor 44 towards pressure reception section 12, rotor 44 is configured to be mechanically coupled with the portion of force output 34 extending through central opening 52. Due to this mechanical couple, rotation of force output 34 by virtue of deformation of deformable element 20 results in rotation by rotor 44 about axle 46. The rotor 44 may extend longitudinally for the length of capacitance section 14. The rotor 44 may include a first set of conductive members 56, a second set of conductive members 58, and a central member 60.

The first set of conductive members 56 may be generally planar in shape extending outward radially from the central member 60 perpendicular to the axis of rotation. The distal portions of first set of conductive members 56 may be arcuate in shape. The first set of conductive members 56 may span an angle of between about 60° to about 80°. In one embodiment, the first set of conductive members 56 span an angle of about 72°. The first set of conductive members 56 may comprise vanes. The spacing between the individual conductive members 56 may be regular or irregular. In one embodiment, the individual conductive members may be spaced apart at regular intervals of about 0.030 inches to about 0.080 inches. The first set of conductive members 56 may be formed integrally with central member 60, or first set of conductive members 56 may be formed separately and affixed to central member 60. The first set of conductive members 56 may be formed of an electrically conductive material, such as aluminum, coated ceramic, circuit board materials, steel, and/or other materials.

The second set of conductive members 58 may be generally planar in shape extending outward radially from the central member 60 perpendicular to the axis of rotation. The distal portions of first set of second set of conductive members 58 may be arcuate in shape. The second set of conductive members 58 may span an angle of of between about 60° to about 80°. In one embodiment, the first set of conductive members 56 span an angle of about 72°. The second set of conductive members 58 may comprise vanes. The spacing between the individual conductive members 58 may be regular or irregular. In one embodiment, the individual conductive members may be spaced apart at regular intervals of about 0.030 inches to about 0.080 inches. The second set of conductive members 58 may be formed integrally with central member 60, or second set of conductive members 58 may be formed separately and affixed to central member 60. The second set of conductive members 58 may be formed of an electrically conductive material, such as aluminum, coated ceramic, circuit board materials, steel, and/or other materials. As can be seen in FIG. 1, in one embodiment, second set of conductive members 58 may be disposed opposite from first set of conductive members 56, such that second set of conductive members 58 are mirror images of first set of conductive members 56 mirrored through the axis of rotation.

As was mentioned above, bearing 54 provides for relatively frictionless rotation of rotor 44 about axle 46 at first end piece 42. A bearing 62 provides for relatively frictionless rotation of rotor 44 about axle 46 at an end of rotor 44 opposite from bearing 54.

The axle stator 48 is configured to be affixed to or formed integrally with first end piece 42 such that rotation of rotor 44 relative to first end piece 42 results in rotation of rotor 44 relative to stator 48. The stator 48 may include one or more portions, including a first stator portion 64 and a second stator portion 66. The first stator portion 64 carries a third set of conductive members 68. The third set of conductive members 68 are generally planar in nature. The third set of conductive members 68 have an orientation that is generally perpendicular to the axis of rotation of rotor 44. The third set of conductive members 68 are disposed in an array along the longitudinal direction of sensor 10 such that they form a set of grooves that correspond spatially to the first set of conductive members 56 carried by rotor 44. By virtue of these grooves, when sensor 10 is assembled the third set of conductive members 68 interleave with the first set of conductive members 56 carried by rotor 44 without directly contacting the first set of conductive members 56.

The first stator portion 64 is formed from an electrically conductive material. Such material provides for the conduction of electricity between the third set of conductive members 68. For example, first stator portion 64 may be formed from aluminum, coated ceramic, circuit board materials, steel, and/or other materials. The third set of conductive members 68 may be formed integrally with first stator portion 64 and/or third set of conductive members 68 may be affixed to first stator portion 64.

By virtue of the interleaving relationship between third set of conductive members 68 and first set of conductive members 56, the third set of conductive members 68 and first set of conductive members 56 form a first capacitor 70. The first capacitor 70 provides a first capacitance between first stator portion 64 and rotor 44. As the rotational orientation of rotor 44 with respect to first stator portion 64 changes, the first capacitance also changes by virtue of portions of first set of conductive members 56 moving outside of the grooves formed by third set of conductive members 68. Since the rotational orientation of rotor 44 is dictated by deformation of deformable element 20, first capacitance is also dictated by external information sources 20. Since the deformation of deformable element 20 is responsive to pressure at pressure interface 18, the first capacitance is also responsive to pressure at pressure interface 18.

The second stator portion 66 carries a fourth set of conductive members 72. The fourth set of conductive members 72 are generally planar in nature. The fourth set of conductive members 72 have an orientation that is generally perpendicular to the axis of rotation of rotor 44. The fourth set of conductive members 72 are disposed in an array along the longitudinal direction of sensor 10 such that they form a set of grooves that correspond spatially to the second set of conductive members 58 carried by rotor 44. By virtue of these grooves, when sensor 10 is assembled the fourth set of conductive members 72 interleave with the second set of conductive members 58 carried by rotor 44 without directly contacting the second set of conductive members 58.

The second stator portion 66 is formed from an electrically conductive material. Such material provides for the conduction of electricity between the fourth set of conductive members 72. For example, second stator portion 66 may be formed from aluminum, coated ceramic, circuit board materials, steel, and/or other materials. The fourth set of conductive members 72 may be formed integrally with second stator portion 66 and/or fourth set of conductive members 72 may be affixed to second stator portion 66.

As is the case with first set of conductive members 56 and third set of conductive members 68, second set of conductive members 58 and fourth set of conductive members 72 form a second capacitor 74. The second capacitor 74 provides a second capacitance between rotor 44 and second stator portion 66. For the reasons described above with respect to first capacitor 70, the second capacitance of second capacitor 74 varies as a function of pressure at pressure interface 18.

The rotor 44 is formed such that first set of conductive members 56 and second set of conductive members 58 are in electric communication. For example, central member 60 may be formed from and/or may carry electrically conductive material that connects first set of conductive members 56 to second set of conductive members 58. Rotor 44 may not be connected directly with any other electrical sources, loads, and/or sinks. As such, rotor 44 may be free from any direct wired connection. This freedom from wired connection to rotor 44 may reduce hysteresis, lag, unwanted friction, and/or other noise, artifacts, and/or phenomena associated with attaching conductive wires to moving parts.

By virtue of the electrical communication between first capacitor 70 and second capacitor 74, first capacitor 70 and second capacitor 74 may form a capacitor pair that are connected in series. Assuming first capacitor 70 and second capacitor 74 have the same maximum capacitance, the capacitance of the resulting capacitor pair is half of the maximum capacitance. Further, as a result of the dependence of the first capacitance and the second capacitance on pressure at pressure interface 18, the capacitance of the capacitor pair formed by rotor 44 and stator 48 also varies as a function of pressure at pressure interface 18.

In one embodiment, the range of motion of rotor 44 is about 72 degrees. In this embodiment, the angle of rotation of rotor 44 over which the individual members in first set of conductive members 56, second set of conductive members 58, third set of conductive members 68, and fourth set of conductive members 72 are formed is about 36 degrees. This configuration will provide for some interleaving between the first set of conductive members 56 and the third set of conductive members 68 and between the second set of conductive members 58 and the fourth set of conductive members 72. This range of motion can be accommodated by deformable element 20 (e.g., the range of motion of deformable element 20 may over its sensitivity range may correspond to 72 degrees of rotation for rotor 44).

In one embodiment, the conductive members of first capacitor 70 and second capacitor 74 are configured such that the change in capacitance responsive to a change in pressure at pressure interface 18 is linear. In another embodiment, the conductive members of first capacitor 70 and second capacitor 74 may be formed such that the capacitance response is non-linear. This may afford for a greater level of sensitivity for some predetermined range (or ranges) of pressures (e.g., for relatively higher pressures, for relatively lower pressures, etc.).

The second end piece 50 may be configured to hold stator 48, along with first end piece 42. The first stator portion 64 and the second stator portion 66 are affixed to first end piece 42 and second end piece 50 via one or more of a fastener, an adhesive, a bonding, a welding, and/or other mechanisms for attaching components. The second end piece 50 forms a central opening 76. The central opening 76 is configured to permit axle 46 to interface with a rotational member 78 extending through central opening 76. The rotational member 78 rotates within central opening 76 by virtue of bearing 62, which is seated in central opening 76.

The second end piece 50 may be formed from one or more non-conductive materials capable of withstanding the operating conditions within a subsurface wellbore for the extraction of fossil fuels. Such materials may include one or more of celazole, ceramic, polyether ether ketone, plastic, and/or other materials.

The terminal section 16 is configured to provide an output of sensor 10. The terminal section 16 includes a first terminal 80 and a second terminal 82. The first terminal 80 is in electrical communication with first stator portion 64 and second terminal 82 is in electrical communication with second stator portion 66. As such, the first terminal 80 and second terminal 82 act as terminals across first capacitor 70 and second capacitor 74 in series. The first terminal 80 and the second terminal 82 extend through second end piece 50, and extend from second end piece 50 in a direction away from the rest of sensor 10. The first terminal 80 and the second terminal 82 may be formed integrally with stator portions 64 and 66, respectively, or first terminal 80 and second terminal 82 may be connected to stator portions 64 and 66.

Figure 3:
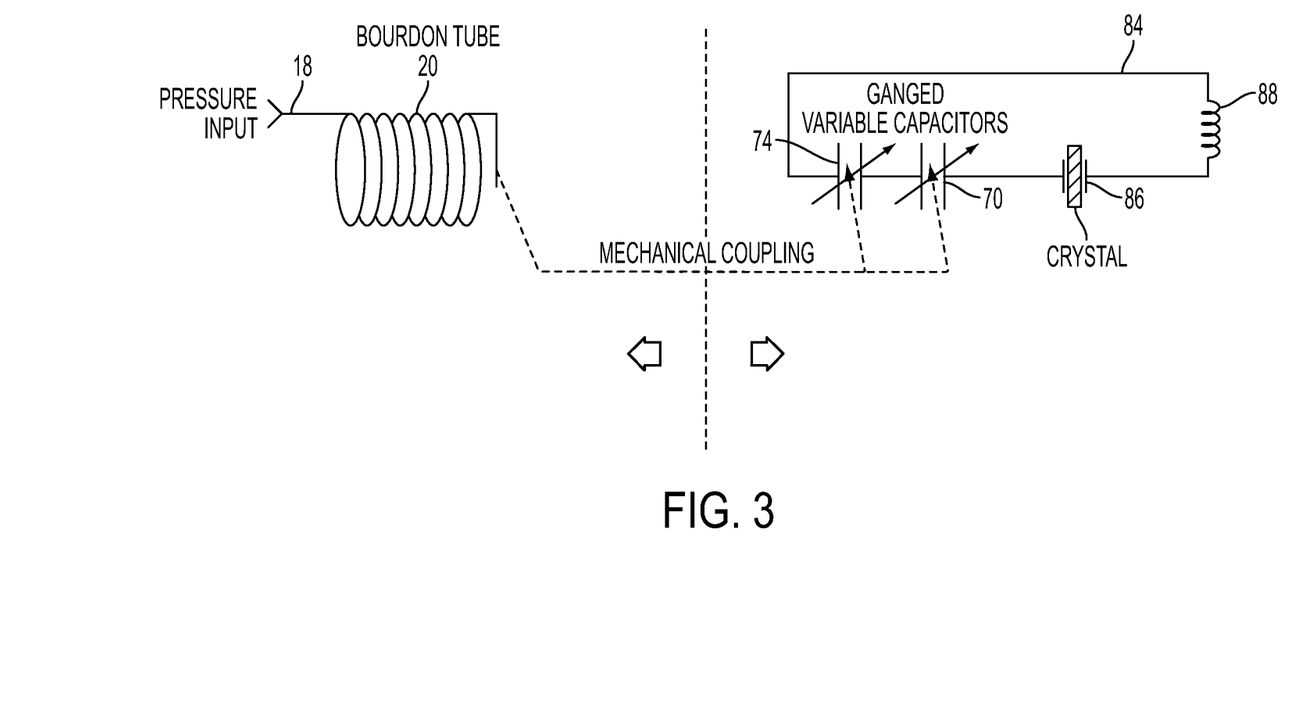
FIG. 3 illustrates a schematic of a sensor circuit, according to one or more embodiments of the invention.

FIG. 3 illustrates a schematic of sensor 10 connected to operate as a pressure sensor. As can be seen in FIG. 3, first capacitor 70 and second capacitor 74 are connected in series, and provide a series capacitance that varies as a function of pressure at pressure interface 18. The first capacitor 70 and second capacitor 74 are included in a sensor circuit 84. The sensor circuit 84 includes sensor 10, an oscillating circuit 86, an inductor 88, and/or other components.

The oscillating circuit 86 is configured to respond to electrical stimulation (e.g., an electromagnetic pulse, or other stimulation) with a predetermined frequency. The oscillating circuit 86 may include, for example, an oscillating crystal, an L-C tank circuit, and/or other oscillating circuit components.

The oscillating crystal may be piezoelectric crystal (e.g., a gallium phosphate crystal), and/or other oscillating crystals.

Figure 4:
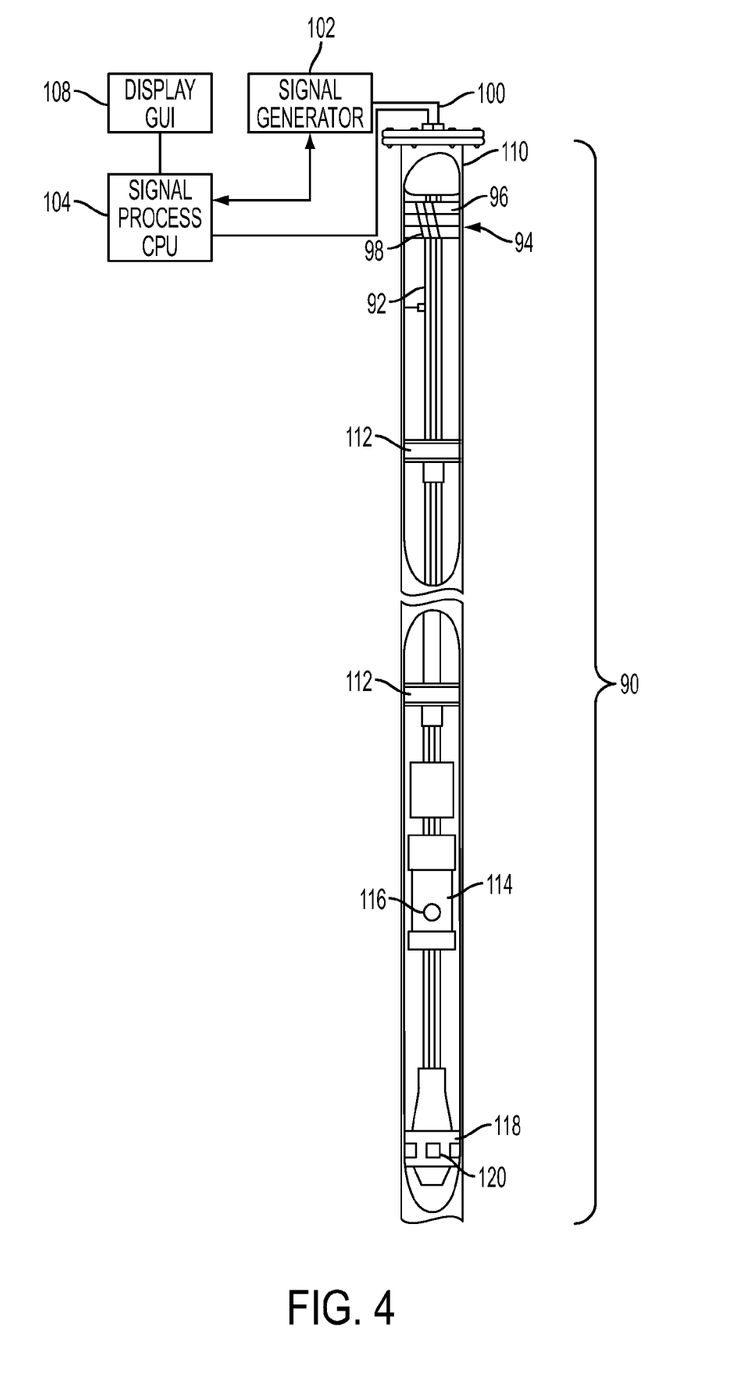
FIG. 4 illustrates a system configured to detect pressure in a subterranean environment, in accordance with one or more embodiments of the invention.

The inductor 88 is configured to inductively link sensor circuit 84 with an overall system that collects pressure information (e.g., as described herein with respect to FIG. 4). In one embodiment, inductor 88 includes a ferrite ring or toroid. In one embodiment, inductor 88 may be replaced by a resistor or other network.

In operation, a signal is provided to sensor circuit 84 via inductor 88. The signal may include, for example, an electromagnetic pulse that induces a current through sensor circuit 84. Responsive to this current, oscillating circuit 86 will "ring" at its predetermined natural frequency. This response is detectable outside of sensor circuit 84 by virtue of output inductor 88. The capacitance provided to sensor circuit 84 by sensor 10 will pull oscillating circuit 86 away from its predetermined natural frequency. Since the capacitance of sensor 10 varies with changes in pressure at pressure interface 18, the amount the ring of sensor circuit 84 is pulled away from the predetermined natural frequency of oscillating circuit 86 will also vary with changes in pressure at pressure interface 18.

FIG. 4 illustrates an example of system 90 configured to monitor pressure in a subsurface borehole. The system 90 includes an electromagnetically transmissive medium, such as a conductive line 92, for conducting electromagnetic energy through the borehole. It will be appreciated by those having ordinary skill in that art that the conductive line 92 may take different forms or embodiments, depending on the state of the borehole. Thus, for example, the conductive line 92 may comprise a production tubing string in a completed borehole or a drillstring in a borehole under construction. Near the top of the conductive line 92, a transformer 94 is provided to couple the conductive pipe to a source of electromagnetic energy. Alternate coupling methods to the transformer 94 may be employed. For example, the transmission line may directly couple to a coaxial cable or any other suitable cable.

In the example embodiment as shown, the transformer 94 includes a stack of ferrite rings 96, and a wire 98 wound around the rings. The wire 98 includes leads 100 that may be coupled to a signal generator 102 which may be configured to produce a pulsed or a continuous wave signal, as necessary or desirable. The wire 98 may further be coupled to a receiver 104. The receiver 104 may be embodied as a computer that includes a bus for receiving signals from the system 90 for storage, processing and/or display. In this regard, the computer 104 may be provided with a display 108 which may include, for example, a graphical user interface.

The computer 104 may include one or more processors configured to execute computer program modules configured to process the modulated frequency to provide a measure of the sensed characteristic. The computer 104 may perform any desired processing of the detected signal including, but not limited to, data logging, a statistical (e.g., Fourier) analysis of the modulated vibration frequency, a deconvolution of the signal, a correlation with another signal or the like. Commercial products are readily available and known to those skilled in the art that can be used to perform any suitable frequency detection. Alternately, the computer may be provided with a look-up table in memory or in accessible storage, that correlates received modulated frequencies to sensed acoustic energy.

In a typical drilling application, the borehole will be lined with a borehole casing 110 which is used to provide structural support to the borehole. This casing 110 is frequently made from a conductive material such as steel, in which case it will cooperate with the line 92 in order to form a coaxial transmission line, and it is not necessary to provide any additional conductive medium. Where the casing 110 is not conductive, a conductive sleeve (not shown) may be provided within the casing 110 in order to form the coaxial structure. In order to maintain a spacing between the line 92 and the casing 110, the system 90 may include dielectric rings 112 disposed periodically along the conductive line 92.

The spacers 112 can, for example, be configured as insulated centralizers which can be disks formed from any suitable material including, but not limited to, nylon or polytetrafluoroethylene (PTFE). Though the illustrated embodiment makes use of a coaxial transmission line, it is contemplated that alternate embodiments of a transmission line may be employed, such as a single conductive line, paired conductive lines, or a waveguide. For example, the casing alone may act as a waveguide for certain frequencies of electromagnetic waves. Furthermore, lengths of coaxial cable may be used in all or part of the line 92. Such coaxial cable may be particularly useful when dielectric fluid cannot be used within the casing 110 (e.g., when saline water or other conductive fluid is present in the casing 110), or when transmitting/conducting signals below a packer or into a lower zone of a well.

A probe portion 114 is located near the distal end of the system 90. In principle, the probe portion may be located at any point along the length of the transmission line. Indeed, multiple such probe portions may be placed at intervals along the length, though this would tend to create additional signal processing burdens in order to differentiate signals from the several probes. Setting a natural resonance frequency of each probe at a different frequency would be, in principle, a type of wavelength multiplexing on the coaxial line that could simplify the processing.

The probe portion 114 includes a port 116 that is configured to communicate ambient pressures from fluid present in the borehole into the probe 114 where it may be sensed by the sensor (e.g., fluid may be directed into pressure interface 18 of sensor 10, shown in FIGS. 1-3 and described herein). Below the probe 114 is illustrated a packer 118 and packer teeth 120.

In use, the signal generator 102 generates an electromagnetic pulse that is transmitted through the transmission line to the probe 114. In an alternate arrangement, the pulse may be generated locally as described in U.S. patent application Ser. No. 11/898,066, herein incorporated by reference.

The probe 114 includes a sensor that includes a resonant circuit portion that, upon receiving the pulse, modulates and re-emits or reflects the pulse back up the transmission line. The resonant circuit may be, for example, a tank circuit that includes inductive and capacitive components. In one embodiment, the sensor included in probe 114 includes sensor 10 and sensor circuit 84, as shown in FIGS. 1-3 and described above.

Figure 5:
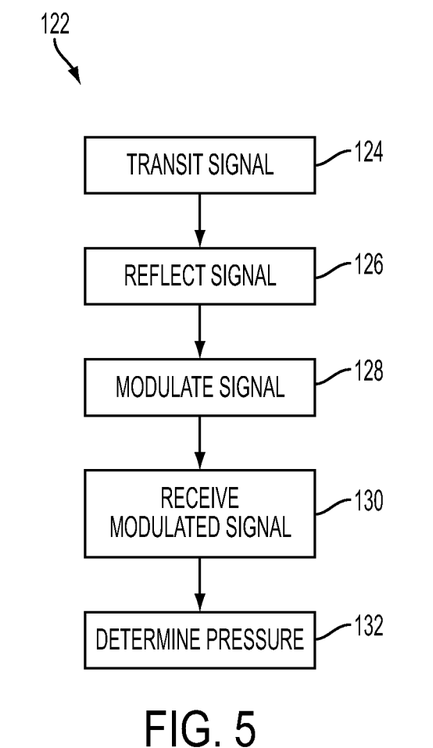
FIG. 5 illustrates a method of detecting pressure in a subterranean environment, according to one or more embodiments of the invention.

FIG. 5 illustrates a method 122 of measuring pressure in a subterranean environment. The operations of method 122 presented below are intended to be illustrative. In some embodiments, method 122 may be accomplished with one or more additional operations not described, and/or without one or more of the operations discussed. Additionally, the order in which the operations of method 122 are illustrated in FIG. 5 and described below is not intended to be limiting. In one embodiment, method 122 is performed by a system having (i) a stator and a rotor configured such that the rotational orientation of the rotor with respect to the stator varies as a function of pressure within the subterranean environment, and (ii) a first capacitor having portions carried by each of the rotor and the stator such that capacitance of the first capacitor varies as a function of rotational orientation of the rotor with respect to the stator. This system may include a pressure sensor similar to or the same as sensor 10 (shown in FIGS. 1-3 and described above).

At an operation 124, an electromagnetic signal is transmitted down a subsurface wellbore. The electromagnetic signal may be an electromagnetic pulse. In one embodiment, operation 124 is performed by a signal generator similar to or the same as signal generator 102 (shown in FIG. 4 and discussed above).

At an operation 126, the electromagnetic signal is reflected with a sensor comprising the stator and rotor, the sensor further comprising a sensor circuit having a resonant frequency that varies with changes in pressure. In one embodiment, operation 126 is performed by a sensor circuit similar to or the same as sensor circuit 84 (shown in FIG. 3 and described above).

At an operation 128, the electromagnetic signal is modulated in response to pressure within the subterranean environment. This modulation may include generating a mechanical force that rotates the rotor relative to the stator responsive to a change in pressure in the subterranean environment. In one embodiment, operation 128 is performed by a sensor circuit similar to or the same as sensor circuit 84 (shown in FIG. 3 and described above).

At an operation 130, the modulated signal is received. This reception may include reception by one or more components above ground. In one embodiment, operation 130 is performed by a signal generator similar to or the same as signal generator 102 (shown in FIG. 4 and described above).

At an operation 132, pressure in the subterranean environment is determined from the modulated signal. In one embodiment, operation 132 is performed by a computer (or other processor) similar to or the same as computer 104 (shown in FIG. 4 and described above).

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A system configured to sense a pressure in a subterranean environment, the system comprising:
   a signal generator configured to generate an electromagnetic signal;
   a sensor probe configured to be located within a region of the subterranean environment, the sensor probe including a resonant circuit portion that includes a capacitive element, the resonant circuit portion being further configured to receive energy from the electromagnetic signal and to generate a resonant signal in response to the electromagnetic signal, wherein the capacitive element of the sensor probe is responsive to a pressure condition in the region of the subterranean environment to modulate the resonant signal in accordance therewith;
   the capacitive element comprising:
      a deformable element being configured to undergo physical deformation responsive to changes in pressure within the region of the subterranean environment;
      a stator;
      a rotor mechanically coupled to the deformable element and configured to rotate with respect to the stator responsive to deformation of the deformable element;
      a first capacitor having portions carried by the rotor and the stator such that capacitance of the first capacitor varies based on the rotational orientation of the rotor with respect to the stator, the capacitance of the first capacitor thereby being indicative of pressure within the region of the subterranean environment; and
      wherein the capacitive element further comprises a second capacitor connected in series with the first capacitor, the second capacitor having portions carried by the rotor and the stator such that capacitance of the second capacitor varies based on the rotational orientation of the rotor with respect to the stator, the capacitance of the second capacitor thereby being indicative of pressure within the region of the subterranean environment;
   a receiver configured to receive the modulated resonant signal; and
   one or more processors configured to process the modulated resonant signal to obtain a measurement of the pressure condition.

2. The system of claim 1, wherein the deformable element is a Bourdon tube.

3. The system of claim 1, wherein the first capacitor comprises:
   a first set of conductive members carried by the rotor; and
   a second set of conductive members carried by the stator, wherein the capacitance between the first set of conductive members and the second set of conductive members varies based on the rotational orientation of the rotor with respect to the stator.

4. The system of claim 3, wherein the first set of conductive members comprise a set of vanes extending from the rotor transverse to an axis of rotation of the rotor, wherein the second set of conductive members carried by the stator form a set of grooves corresponding to the set of vanes, and wherein the set of vanes and the set of grooves are configured to interleave.

5. The system of claim 1, wherein the series of capacitors formed by the first capacitor and the second capacitor further comprises:
   a first terminal of the series of capacitors formed by the first capacitor and the second capacitor, the first terminal being coupled with the portion of the first capacitor carried by the stator;
   a second terminal of the series of capacitors formed by the first capacitor and the second capacitor, the second terminal being coupled with the portion of the second capacitor carried by the stator; and
   wherein the first capacitor and the second capacitor are connected in series via an electrical connection carried by the rotor.

6. A method of measuring pressure in subterranean environment using a system having (i) a stator and a rotor configured such that the rotational orientation of the rotor with respect to the stator varies as a function of pressure within the subterranean environment, (ii) a first capacitor having portions carried by each of the rotor and the stator such that capacitance of the first capacitor varies as a function of rotational orientation of the rotor with respect to the stator, and (iii) a second capacitor having portions carried by each of the rotor and the stator such that capacitance of the second capacitor varies as a function of rotational orientation of the rotor with respect to the stator, wherein the second capacitor is connected in series with the first capacitor, the method comprising:
    generating a signal having a predetermined frequency spectrum; and
    modulating the frequency spectrum of the generated signal based on the rotational orientation of the rotor with respect to the stator, such modulation being indicative of pressure in the subterranean environment.

7. The method of claim 6, wherein the modulating comprises generating a mechanical force that rotates the rotor relative to the stator responsive to a change in pressure in the subterranean environment.

8. The method of claim 7, wherein the generating is performed by a deformable element configured to deform responsive to changes in pressure.

9. The method of claim 8, wherein the deformable element is a Bourdon tube.

10. The method of claim 6, wherein the first capacitor and the second capacitor are connected in series via an electrical connection carried by the rotor.

11. A pressure sensor comprising:
    a pressure interface portion having a pressure interface open to an environment to be sensed;
    a deformable element in fluid communication with the pressure interface, the deformable element being configured to undergo physical deformation responsive to changes in pressure;
    a stator;
    a rotor mechanically coupled to the deformable element and configured to rotate with respect to the stator responsive to deformation of the deformable element;
    a first capacitor having portions carried by the rotor and the stator such that capacitance of the first capacitor varies based on the rotational orientation of the rotor with respect to the stator, the capacitance of the first capacitor thereby being indicative of pressure at the pressure interface; and
    a second capacitor connected in series with the first capacitor, the second capacitor having portions carried by the rotor and the stator such that capacitance of the second capacitor varies based on the rotational orientation of the rotor with respect to the stator, the capacitance of the second capacitor thereby being indicative of pressure at the pressure interface.

12. The sensor of claim 11, wherein the deformable element is a Bourdon tube.

13. The sensor of claim 11, wherein the first capacitor comprises:
    a first set of conductive members carried by the rotor; and
    a second set of conductive members carried by the stator,
    wherein the capacitance between the first set of conductive members and the second set of conductive members varies based on the rotational orientation of the rotor with respect to the stator.

14. The sensor of claim 13, wherein the first set of conductive members comprise a set of vanes extending from the rotor transverse to an axis of rotation of the rotor, wherein the second set of conductive members carried by the stator form a set of grooves corresponding to the set of vanes, and wherein the set of vanes and the set of grooves are configured to interleave.

15. The sensor of claim 11, further comprising:
    a first terminal of the series of capacitors formed by the first capacitor and the second capacitor, the first terminal being coupled with the portion of the first capacitor carried by the stator;
    a second terminal of the series of capacitors formed by the first capacitor and the second capacitor, the second terminal being coupled with the portion of the second capacitor carried by the stator; and
    wherein the first capacitor and the second capacitor are connected in series via an electrical connection carried by the rotor.

16. A system configured to sense a pressure in a subterranean environment, the system comprising:
    a signal generator configured to generate an electromagnetic signal;
    a sensor probe configured to be located within a region of the subterranean environment, the sensor probe including a resonant circuit portion that includes a capacitive element, the resonant circuit portion being further configured to receive energy from the electromagnetic signal and to generate a resonant signal in response to the electromagnetic signal, wherein the capacitive element of the sensor probe is responsive to a pressure condition in the region of the subterranean environment to modulate the resonant signal in accordance therewith;
    the capacitive element comprising:
        a deformable element being configured to undergo physical deformation responsive to changes in pressure within the region of the subterranean environment;
        a stator;
        a rotor mechanically coupled to the deformable element and configured to rotate with respect to the stator responsive to deformation of the deformable element; and
        a first capacitor having portions carried by the rotor and the stator such that capacitance of the first capacitor varies based on the rotational orientation of the rotor with respect to the stator, the capacitance of the first capacitor thereby being indicative of pressure within the region of the subterranean environment, wherein the first capacitor comprises:
            a first set of conductive members carried by the rotor; and
            a second set of conductive members carried by the stator,
            wherein the capacitance between the first set of conductive members and the second set of conductive members varies based on the rotational orientation of the rotor with respect to the stator,
            wherein the first set of conductive members comprise a set of vanes extending from the rotor transverse to an axis of rotation of the rotor,
            wherein the second set of conductive members carried by the stator form a set of grooves corresponding to the set of vanes, and
            wherein the set of vanes and the set of grooves are configured to interleave;
    a receiver configured to receive the modulated resonant signal; and
    one or more processors configured to process the modulated resonant signal to obtain a measurement of the pressure condition.

17. The system of claim 16, wherein the deformable element is a Bourdon tube.

18. A pressure sensor comprising:
    a pressure interface portion having a pressure interface open to an environment to be sensed;

a deformable element in fluid communication with the pressure interface, the deformable element being configured to undergo physical deformation responsive to changes in pressure;

a stator;

a rotor mechanically coupled to the deformable element and configured to rotate with respect to the stator responsive to deformation of the deformable element; and a first capacitor having portions carried by the rotor and the stator such that capacitance of the first capacitor varies based on the rotational orientation of the rotor with respect to the stator, the capacitance of the first capacitor thereby being indicative of pressure at the pressure interface, wherein the first capacitor comprises:

a first set of conductive members carried by the rotor; and a second set of conductive members carried by the stator, wherein the capacitance between the first set of conductive members and the second set of conductive members varies based on the rotational orientation of the rotor with respect to the stator, wherein the first set of conductive members comprise a set of vanes extending from the rotor transverse to an axis of rotation of the rotor, wherein the second set of conductive members carried by the stator form a set of grooves corresponding to the set of vanes, and wherein the set of vanes and the set of grooves are configured to interleave.

19. The sensor of claim 18, wherein the deformable element is a Bourdon tube.

\* \* \* \* \*